(12) United States Patent
Whitney et al.

(10) Patent No.: US 8,233,887 B2
(45) Date of Patent: Jul. 31, 2012

(54) COVERT MESSAGE REDACTION AND RECOVERY IN A WIRELESS COMMUNICATION DEVICE

(75) Inventors: Jason Kent Whitney, Lee's Summit, MO (US); Jason R. Delker, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 176 days.

(21) Appl. No.: 12/845,466

(22) Filed: Jul. 28, 2010

(65) Prior Publication Data

US 2012/0028659 A1 Feb. 2, 2012

(51) Int. Cl.
*H04M 1/725* (2006.01)

(52) U.S. Cl. ............... 455/412.1; 455/412.2; 455/414.4; 709/206

(58) Field of Classification Search ............... 455/412.1, 455/412.2, 414.4, 466, 59, 61, 566, 158.4; 709/206; 713/170
See application file for complete search history.

(56) References Cited

U.S. PATENT DOCUMENTS

| | | | | |
|---|---|---|---|---|
| 4,826,211 A * | 5/1989 | Sinnott et al. | .................. | 283/117 |
| 5,493,692 A | 2/1996 | Theimer et al. | | |
| 5,640,419 A | 6/1997 | Janusas | | |
| 5,870,215 A | 2/1999 | Milano et al. | | |
| 5,923,849 A | 7/1999 | Venkatraman | | |
| 5,933,785 A | 8/1999 | Tayloe | | |
| 5,987,325 A | 11/1999 | Tayloe | | |
| 6,029,150 A * | 2/2000 | Kravitz | ........................... | 705/39 |
| 6,163,564 A | 12/2000 | Rudish et al. | | |
| 6,270,122 B1 * | 8/2001 | Shadle et al. | ................... | 283/95 |
| 6,318,760 B1 * | 11/2001 | Shadle et al. | ................... | 283/95 |
| 6,583,714 B1 | 6/2003 | Gabou et al. | | |
| 6,641,691 B2 * | 11/2003 | Shadle et al. | ................. | 156/155 |
| 7,124,164 B1 | 10/2006 | Chemtob | | |
| 7,130,885 B2 * | 10/2006 | Chandra et al. | ............... | 709/206 |
| 7,209,955 B1 | 4/2007 | Major et al. | | |
| 7,250,846 B2 | 7/2007 | Ebling et al. | | |
| 7,539,730 B2 * | 5/2009 | Adams et al. | ................. | 709/206 |

(Continued)

FOREIGN PATENT DOCUMENTS

EP 1681841 7/2006

(Continued)

OTHER PUBLICATIONS

Sprint; "Phone User Guide—Sprint PCS Vision Phone SCP-7000 by Sanyo;" Jan. 2006; pp. 1-254; Sprint Nextel; http://support.sprint.com/global/pdf/user_guides/sanyo/scp7000/scp7000_by_sanyo_ug.pdf.

(Continued)

*Primary Examiner* — Minh D Dao (57) ABSTRACT

A wireless communication device comprises a user interface, a memory, a wireless communication interface, and a processing system. The wireless communication interface is configured to wirelessly receive a message. The processing system is configured to direct the memory to store the message. The processing system is configured to drive the user interface to display the message, display a message redaction indicator, and responsively receive a message redaction instruction. The processing system is configured to redact a portion of the message responsive to the message redaction instruction and direct the memory to store the redacted portion of the message. The processing system is configured to drive the user interface to display the message without the redacted portion, display a message recovery indicator, and responsively receive a message recovery instruction. The processing system is configured to recover the message responsive to the message recovery instruction and drive the user interface to display the message with the previously redacted portion.

20 Claims, 7 Drawing Sheets

U.S. PATENT DOCUMENTS

| | | | |
|---|---|---|---|
| 7,552,467 B2 * | 6/2009 | Lindsay | 726/5 |
| 7,590,696 B1 * | 9/2009 | Odell et al. | 709/206 |
| 7,882,183 B2 * | 2/2011 | Craft et al. | 709/206 |
| 7,900,845 B2 * | 3/2011 | Stagg | 235/493 |
| 7,908,329 B2 * | 3/2011 | Tsang et al. | 709/206 |
| 2002/0113688 A1 | 8/2002 | Ide | |
| 2005/0064854 A1 | 3/2005 | Jang | |
| 2006/0025112 A1 | 2/2006 | Hamanaga et al. | |
| 2006/0104445 A1 | 5/2006 | Lai et al. | |
| 2007/0043815 A1 * | 2/2007 | Tsang et al. | 709/206 |
| 2007/0072616 A1 | 3/2007 | Irani | |
| 2009/0088168 A1 | 4/2009 | Varanasi | |
| 2009/0259588 A1 * | 10/2009 | Lindsay | 705/40 |
| 2010/0070896 A1 * | 3/2010 | Attinger | 715/765 |
| 2011/0078150 A1 * | 3/2011 | Rashad et al. | 707/741 |
| 2011/0078175 A1 * | 3/2011 | Rashad et al. | 707/769 |
| 2011/0154040 A1 * | 6/2011 | Bheemanna | 713/170 |
| 2011/0213700 A1 * | 9/2011 | Sant'Anselmo | 705/39 |

FOREIGN PATENT DOCUMENTS

| | | |
|---|---|---|
| EP | 1717685 | 11/2006 |
| EP | 1775669 | 4/2007 |
| WO | 2005050857 | 6/2005 |
| WO | 2009050254 | 4/2009 |

OTHER PUBLICATIONS

Amy K. Karlson, et al.; "Can I Borrow Your Phone? Understanding Concerns When Sharing Mobile Phones," CHI 2009~Studying Cell Phone Use; Apr. 8, 2009; pp. 1647-1650; Microsoft Research; Boston, MA.

USPTO Office Action Summary from U.S. Appl. No. 12/060,320 mailed Oct. 25, 2010.

* cited by examiner

COVERT MESSAGE REDACTION AND RECOVERY IN A WIRELESS COMMUNICATION DEVICE

TECHNICAL BACKGROUND

Many individuals are increasingly utilizing wireless communication devices to remain in contact with friends and business contacts. For example, a user of a wireless communication device may utilize voice calls, voice mail messages, email, Short Message Service (SMS) text messages, multimedia message service (MMS) messages, and Instant Messaging (IM) applications to stay in touch with various contacts. Typically, the user will receive contact attempts through these communication services frequently throughout the day.

However, some messages that the user receives may be private or contain sensitive information that the user may wish to protect. For example, a user who subscribes to a service account may request an email or SMS text message reminder of the account password. In another example, a user may receive a message from a friend that contains an embarrassing anecdote about the user. Due to the private nature of such messages, the user may be tempted to delete the messages to prevent others from viewing their contents. Typically, when the user deletes a message from a wireless communication device, the message is permanently removed from a memory of the device, thereby preventing the user from viewing the message on the wireless communication device at a future time.

OVERVIEW

A wireless communication device comprises a user interface, a memory, a wireless communication interface, and a processing system. The wireless communication interface is configured to wirelessly receive a message. The processing system is configured to direct the memory to store the message. The processing system is configured to drive the user interface to display the message, display a message redaction indicator, and responsively receive a message redaction instruction. The processing system is configured to redact a portion of the message responsive to the message redaction instruction and direct the memory to store the redacted portion of the message. The processing system is configured to drive the user interface to display the message without the redacted portion, display a message recovery indicator, and responsively receive a message recovery instruction. The processing system is configured to recover the message responsive to the message recovery instruction and drive the user interface to display the message with the previously redacted portion.

A method of operating a wireless communication device comprises wirelessly receiving a message, storing the message, and displaying the message, displaying a message redaction indicator and responsively receiving a message redaction instruction, redacting a portion of the message responsive to the message redaction instruction and storing the redacted portion of the message, displaying the message without the redacted portion, displaying a message recovery indicator and responsively receiving a message recovery instruction, recovering the message responsive to the message recovery instruction and displaying the message with the previously redacted portion.

A wireless communication device comprises a user interface, a memory, a wireless communication interface, and a processing system. The wireless communication interface is configured to wirelessly receive a short message service (SMS) message. The processing system is configured to direct the memory to store the SMS message. The processing system is configured to drive the user interface to display the SMS message, covertly display a message redaction indicator, and responsively receive a message redaction instruction. The processing system is configured to redact a portion of the SMS message responsive to the message redaction instruction and direct the memory to store the redacted portion of the SMS message. The processing system is configured to drive the user interface to display the SMS message without the redacted portion, covertly display a message recovery indicator, receive a selection of the message recovery indicator, prompt for user authentication responsive to the selection of the message recovery indicator, and responsively receive a message recovery instruction. The processing system is configured to recover the SMS message responsive to the message recovery instruction and drive the user interface to display the SMS message with the previously redacted portion.

DETAILED DESCRIPTION

The following description and associated drawings teach the best mode of the invention. For the purpose of teaching inventive principles, some conventional aspects of the best mode may be simplified or omitted. The following claims specify the scope of the invention. Some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
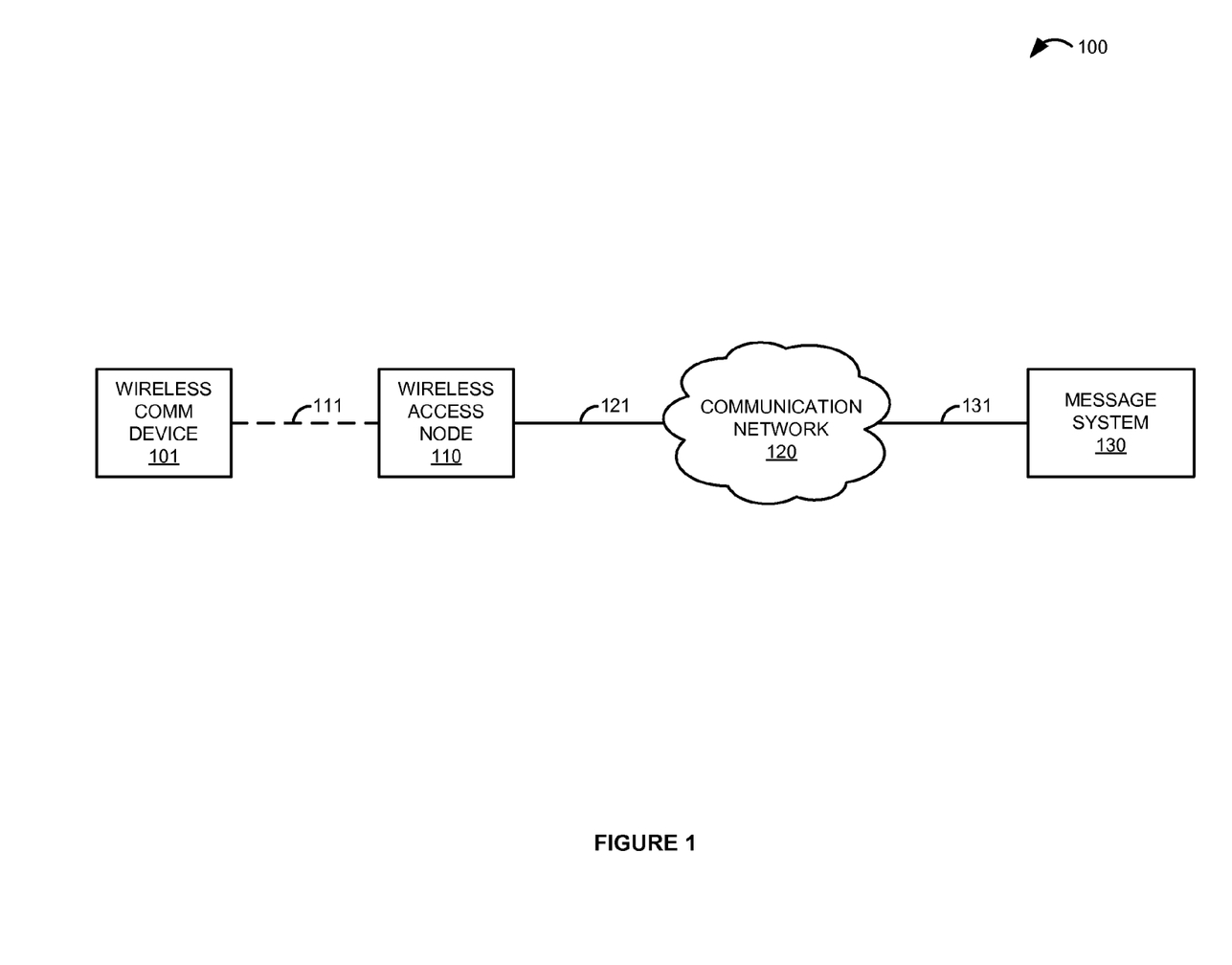
FIG. 1 is a block diagram that illustrates a communication system.

FIG. 1 is a block diagram that illustrates communication system 100. Communication system 100 includes wireless communication device 101, wireless access node 110, communication network 120, and message system 130. Wireless communication device 101 is in communication with wireless access node 110 over communication link 111. Wireless access node 110 communicates with communication network 120 over communication link 121. Message system 130 is in communication with communication network 120 over communication link 131.

Figure 2:
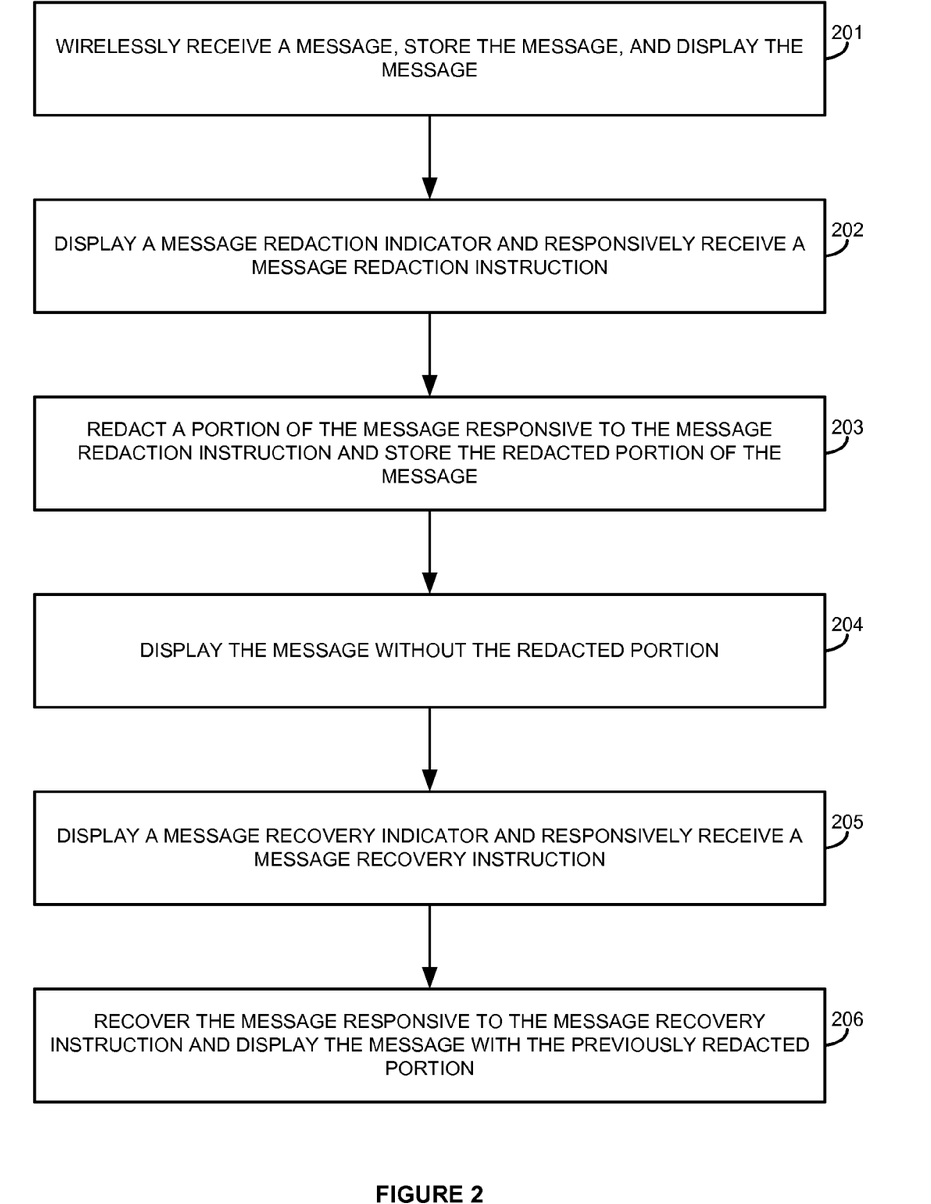
FIG. 2 is a flow diagram that illustrates an operation of the communication system.

FIG. 2 is a flow diagram that illustrates an operation of communication system 100. The steps of the operation are indicated below parenthetically. In FIG. 2, wireless communication device 101 wirelessly receives a message, stores the message, and displays the message (201). The message could comprise any textual correspondence or other notification received by wireless communication device 101. For example, the message could comprise an email message, short message service (SMS) message, multimedia message service (MMS) message, voicemail message, visual voicemail message, hypertext transfer protocol (HTTP) message, instant messaging (IM) message, or any other type of message—including combinations thereof. Typically, wireless communication device 101 stores the message in a memory device of wireless communication device 101. However, in some examples, wireless communication device 101 may be in communication with a database or some other storage system that provides external storage for storing the message. Wireless communication device 101 also displays the message on a user interface of device 101.

Wireless communication device 101 then displays a message redaction indicator and responsively receives a message redaction instruction (202). In some examples, the message redaction indicator could comprise a menu, menu item, icon, button, listed option, or some other screen element displayed on a user interface of wireless communication device 101. The message redaction indicator provides a mechanism for a user of wireless communication device 101 to redact a portion of the message. Typically, the message redaction indicator is covertly invoked. For example, the message redaction indicator may be displayed responsive to receiving a selection of a covert redaction option. The covert redaction option could comprise, for example, a hidden menu item, a mislabeled menu item or list option, a secret alphanumeric code entered by a user, an icon, button, or other graphic appearing on a user interface of wireless communication device 101, or some other secret or hidden option that may be used to invoke the message redaction indicator. In some examples, a battery icon that ordinarily only indicates a charge capacity of wireless communication device 101 could comprise a hidden function that invokes the message redaction indicator when pressed by a user of wireless communication device 101.

After displaying the message redaction indicator, wireless communication device 101 responsively receives a message redaction instruction (202). The message redaction instruction could comprise a command that instructs wireless communication device 101 to redact at least a portion of the message. A user of wireless communication device 101 typically provides the message redaction instruction by selecting a portion of the message to redact. In addition, the message redaction instruction could comprise a selection of a redaction technique from the message redaction indicator. For example, if the message redaction indicator comprises a menu of redaction techniques, the message redaction instruction could comprise a selection of a listed redaction technique from that menu. Some examples of redaction techniques include scrambling text, blacking-out text, covering text with symbols, numbers, or alternate text, replacing text with ellipses, encrypting text, or simply hiding or removing the text.

Responsive to the message redaction instruction, wireless communication device 101 redacts a portion of the message and stores the redacted portion of the message (203). To redact the portion of the message, wireless communication device 101 could use any of the redaction techniques described above, among others, as directed by the message redaction instruction. In addition, a user of wireless communication device 101 could provide a message redaction instruction that directs device 101 to replace the text with alternate text. For example, the user could effectively edit the message by providing a message redaction instruction that directs wireless communication device 101 to replace the portion of the message with different text provided by the user in the message redaction instruction. Typically, wireless communication device 101 stores the redaction portion of the message in a memory device of wireless communication device 101, but in other examples, wireless communication device 101 may store the redacted portion in a database or some other storage system that provides external storage. In some examples, the redacted portion of the message is encrypted prior to storage.

After redacting the portion of the message, wireless communication device 101 displays the message without the redacted portion (204). Thus, the message is typically displayed with the redacted portion removed according to the redaction technique specified in the message redaction instruction. In some examples, wireless communication device 101 displays the message without the redacted portion along with a covert notification that indicates the message is partially redacted. The covert notification could comprise any visual or auditory notification that the message is being displayed without the redacted portion that does not overtly indicate that the message has been redacted. For example, the covert notification could comprise a changed location of a displayed item, a rotation of a displayed item, a change in color of a displayed item, a new display item, or any other subtle visual alteration in a display of wireless communication device 101. Some examples of displayed items could comprise a battery icon, a calendar, a time, a date, a signal strength indicator, or any other visual element displayed by wireless communication device 101. The covert notification could also comprise a tone, chime, or some other auditory indicator that alerts the user that the message is being displayed without the redacted portion.

Referring again to FIG. 2, wireless communication device 101 displays a message recovery indicator and responsively receives a message recovery instruction (205). In some examples, the message recovery indicator simply comprises the symbols, ellipses, dashes, or other redaction technique to indicate to the user of device 101 that the portion of the message is redacted. However, in other examples, the message recovery indicator could comprise a menu, menu item, icon, button, listed option, or some other screen element displayed on a user interface of wireless communication device 101. Typically, the message recovery indicator provides a mechanism for a user of wireless communication device 101 to recover the redacted portion of the message.

In some examples, the message recovery indicator may be covertly invoked. For example, the message recovery indicator may be displayed responsive to receiving a selection of a covert recovery option. The covert recovery option could comprise, for example, a hidden menu item, a mislabeled menu item or list option, a secret alphanumeric code entered by a user, an icon, button, or other graphic appearing on a user interface of wireless communication device 101, or some other secret or hidden option that may be used to invoke the message recovery indicator. In some examples, the message recovery indicator could be invoked in the same manner as the message redaction indicator. For example, the covert recovery option and the covert redaction option could comprise the same display item, where the function of the display item toggles between invoking the message recovery indicator or the message redaction indicator depending on whether or not the message comprises a redacted portion.

After displaying the message recovery indicator, wireless communication device 101 responsively receives a message recovery instruction (205). The message recovery instruction could comprise a command that that instructs wireless communication device 101 to recover the redacted portion of the message. In some examples, the message redaction instruction could comprise a selection of a recovery technique from the message recovery indicator. For example, if the message recovery indicator comprises a menu that allows the user to temporarily reveal or permanently restore the redacted portion, the message redaction instruction could comprise a selection from that menu. In addition, a user of wireless communication device 101 could provide the message redaction instruction by selecting only a portion of the redacted portion of the message to recover. For example, if the redacted portion of the message comprises a full sentence, the user may select only a single word of the redacted sentence for recovery.

Responsive to the message recovery instruction, wireless communication device 101 recovers the message and displays the message with the previously redacted portion (206). Typically, wireless communication device 101 retrieves the redacted portion from a memory device and restores the message to its original content. In other examples, wireless communication device 101 may retrieve the original message from storage to recover the message. In some examples, wireless communication device 101 only recovers the message after successful user authentication. For example, prior to processing the message recovery instruction and recovering the message, wireless communication device 101 may prompt the user for a password or other credentials to confirm the user's authorization to recover and view the entire message with the previously redacted portion.

Advantageously, by providing a message redaction instruction to wireless communication device 101, the user is able to redact only a portion of a message received by device 101. The redacted portion may be hidden from view, and a covert notification may indicate to the user that the message is partially redacted. In this manner, a third party who operates wireless communication device 101 would remain unaware that the message has a redacted portion that is not being displayed. In addition, since wireless communication device 101 stores the redacted portion of the message, the user may provide a message recovery instruction to recover the previously redacted portion of the message, thereby enabling the user to view the complete, original message in its entirety.

Referring back to FIG. 1, wireless communication device 101 may comprise any device having wireless communication connectivity with hardware and circuitry programmed to function as a telecommunications device, such as Radio Frequency (RF) communication circuitry and an antenna. The RF communication circuitry typically includes an amplifier, filter, modulator, and signal processing circuitry. Wireless communication device 101 may also include a user interface, memory device, software, processing circuitry, or some other communication components. For example, wireless communication device 101 could comprise a telephone, transceiver, mobile phone, cellular phone, smartphone, computer, personal digital assistant (PDA), e-book, game console, mobile Internet device, wireless network interface card, media player, or some other wireless communication apparatus—including combinations thereof. Wireless network protocols that may be utilized by wireless communication device 101 include Code Division Multiple Access (CDMA) 1xRTT, Global System for Mobile communications (GSM), Universal Mobile Telecommunications System (UMTS), High-Speed Packet Access (HSPA), Evolution-Data Optimized (EV-DO), EV-DO rev. A, Third Generation Partnership Project Long Term Evolution (3GPP LTE), Worldwide Interoperability for Microwave Access (WiMAX), IEEE 802.11 protocols (Wi-Fi), Bluetooth, Internet, telephony, or any other wireless network protocol that facilitates communication between wireless communication device 101 and wireless access node 110.

Wireless access node 110 comprises RF communication circuitry and an antenna. The RF communication circuitry typically includes an amplifier, filter, RF modulator, and signal processing circuitry. Wireless access node 110 may also comprise a router, server, memory device, software, processing circuitry, cabling, power supply, network communication interface, structural support, or some other communication apparatus. Wireless access node 110 could comprise a base station, Internet access node, telephony service node, wireless data access point, or some other wireless communication system—including combinations thereof. Some examples of wireless access node 110 include a base transceiver station (BTS), base station controller (BSC), radio base station (RBS), Node B, enhanced Node B (eNode B), and others. Wireless network protocols that may be utilized by wireless access node 110 include CDMA, GSM, UMTS, HSPA, EV-DO, EV-DO rev. A, 3GPP LTE, WiMAX, Wi-Fi, Bluetooth, Internet, telephony, or some other communication format—including combinations thereof.

Communication network 120 comprises the core network of a wireless communication provider, and could include routers, gateways, telecommunication switches, servers, processing systems, or other communication equipment and systems for providing communication and data services. Communication network 120 could comprise wireless communication nodes, telephony switches, Internet routers, network gateways, computer systems, communication links, or some other type of communication equipment—including combinations thereof. Communication network 120 may also comprise optical networks, asynchronous transfer mode (ATM) networks, packet networks, local area networks (LAN), metropolitan-area networks (MAN), wide area networks (WAN), or other network topologies, equipment, or systems—including combinations thereof. Communication network 120 may be configured to communicate over metallic, wireless, or optical links. Communication network 120 may be configured to use time-division multiplexing (TDM), Internet Protocol (IP), Ethernet, optical networking, wireless protocols, communication signaling, or some other communication format—including combinations thereof. In some examples, communication network 120 includes further access nodes and associated equipment for providing communication services to many wireless communication devices across a large geographic region.

Message system 130 comprises a computer system and communication interface. Message system 130 may also include other components such as a router, server, data storage system, and power supply. Message system 130 may reside in a single device or may be distributed across multiple devices. Message system 130 may be a discrete system or may be integrated within other systems—including other systems within communication system 100. Message system 130 could comprise a packet gateway, mobile switching center, network gateway system, Internet access node, application server, service node, firewall, or some other communication system—including combinations thereof. Some examples of message system 130 could include systems providing Instant Messaging (IM) services, email systems, short message service (SMS) or multimedia message service (MMS) systems, or any other system configured to transfer a message for delivery to wireless communication device 101.

Wireless communication link 111 uses the air or space as the transport medium. Wireless communication link 111 may use various protocols, such as CDMA, GSM, UMTS, HSPA, EV-DO, EV-DO rev. A, 3GPP LTE, WiMAX, Wi-Fi, Bluetooth, Internet, telephony, or some other communication format—including combinations thereof. Wireless communication link 111 may comprise many different signals sharing the same link. For example, wireless communication link 111 could include multiple signals operating in a single propagation path comprising multiple communication sessions, frequencies, timeslots, transportation ports, logical transportation links, network sockets, IP sockets, packets, or communication directions—including combinations thereof.

Communication links 121 and 131 use metal, air, space, optical fiber such as glass or plastic, or some other material as the transport media—including combinations thereof. Communication links 121 and 131 could use various communication protocols, such as TDM, IP, Ethernet, telephony, optical networking, hybrid fiber coax (HFC), communication signaling, wireless protocols, or some other communication format—including combinations thereof. Communication links 121 and 131 may be direct links or could include intermediate networks, systems, or devices.

Figure 3A:
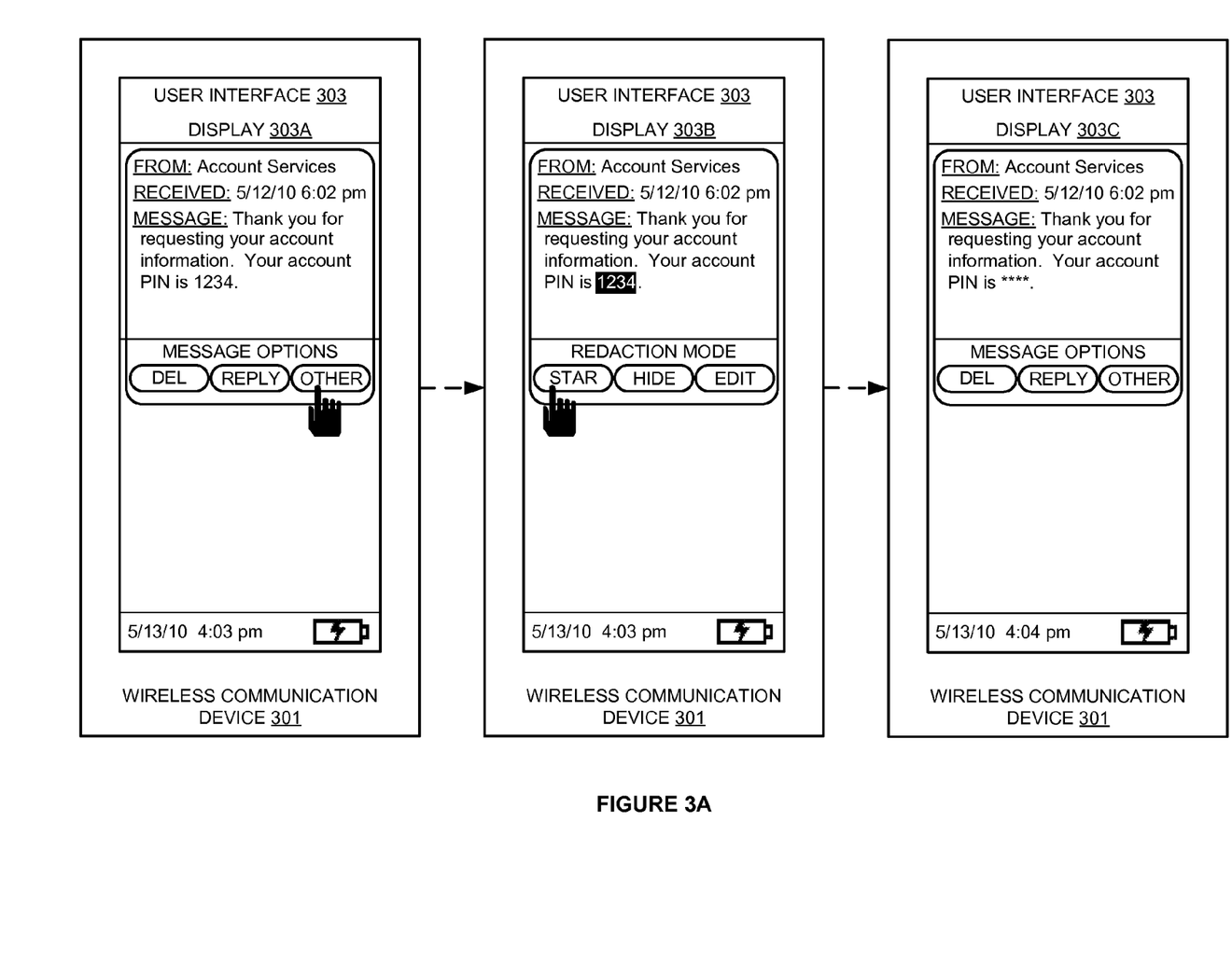
FIG. 3A is a block diagram that illustrates exemplary displays on a user interface of a wireless communication device in an exemplary embodiment.

FIG. 3A is a block diagram that illustrates exemplary displays 303A-303C on user interface 303 of wireless communication device 301 in an exemplary embodiment. The displays 303A-303C provide an example of a user experience when operating wireless communication device 301 to redact a portion of a message.

In display 303A, a user has received an SMS text message which is displayed on user interface 303. The message was received from Account Services and includes the user's PIN information for an account owned by the user. Since an account PIN is sensitive and private information, the user would like to prevent unauthorized persons from viewing the PIN. However, instead of simply deleting the message, the user desires to save the message so that the PIN may be viewed in the future in the event the user forgets the PIN. In display 303A, three message options are presented to the user, which are shown as the "del", "reply", and "other" buttons. In this example, the "other" button comprises a covert redaction option which allows the user to covertly invoke a message redaction indicator. In other examples, pressing the "other" button could launch a menu with several additional message options. The menu could include a covert redaction option that could be used to trigger a message redaction indicator, such as a hidden menu item or mislabeled menu item that does not overtly indicate the ability to invoke the message redaction indicator. In this example, the user is shown selecting the "other" button with the hand graphic in order to covertly invoke a message redaction indicator.

Display 303B shows a redaction mode menu that the user has invoked by pressing the "other" button on display 303A. The redaction mode menu comprises a message redaction indicator. The redaction mode menu provides options for the user to replace text with stars as indicated by the "star" button, remove text as indicated by the "hide" button, or replace text with alternate text using the "edit" button. In display 303B, the user has selected the PIN digits "1234" as shown by the black highlighting appearing over the PIN information. In addition, the user has selected the "star" button to direct wireless communication device 301 to replace the selected text with stars. The selected text and the selection of the "star" button could comprise a message redaction instruction for wireless communication device 301. In some examples, wireless communication device 301 prompts the user for a password in response to receiving the message redaction instruction. The password may be provided by the user so that the user may protect the information but retain the ability to retrieve the redacted text in the future using the password. However, in this example, wireless communication device 301 does not prompt the user for a password because the user has previously configured wireless communication device 301 to always password-protect redacted text using a predetermined default password. In some examples, the default password could comprise the same password the user provided for a different feature associated with wireless communication device 301, such as a user profile password, email account password, or some other password associated with wireless communication device 301 or the user's communication service account.

In response to the message redaction instruction provided by the user as shown in display 303B, wireless communication device 301 processes the message redaction instruction to redact the portion of the message specified in the instruction. As shown on display 303C, wireless communication device 301 then displays the message without the redacted portion on user interface 303. In display 303C, the user's account PIN has been masked by four star symbols. In this manner, the user has effectively redacted the sensitive account information that was received in the message. Advantageously, any person reading the message would not be able to view the user's actual account PIN since it has been redacted and replaced with stars.

Figure 3B:
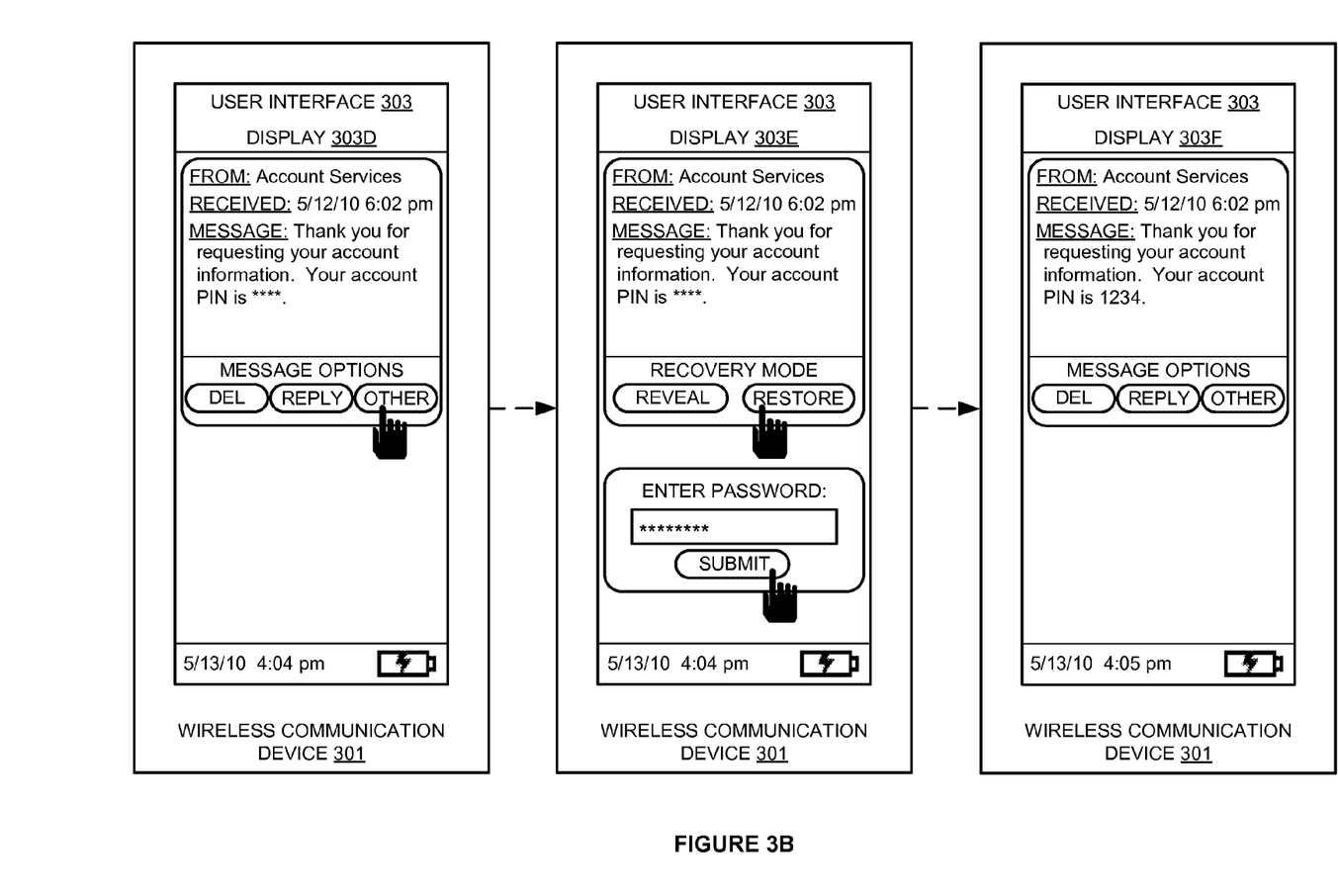
FIG. 3B is a block diagram that illustrates exemplary displays on a user interface of a wireless communication device in an exemplary embodiment.

FIG. 3B is a block diagram that illustrates exemplary displays 303D-303F on user interface 303 of wireless communication device 301 in an exemplary embodiment. The displays 303D-303F provide an example of a user experience when operating wireless communication device 301 to recover a previously redacted portion of a message. FIG. 3B is a continuation of FIG. 3A in which a user redacted the account PIN information received in an SMS text message from Account Services.

In display 303D, the message is displayed without the redacted portion, as shown by the star symbols which mask the account PIN. In FIG. 3B, the user of wireless communication device 301 desires to recover the redacted PIN. In display 303D, three message options are presented to the user, which are shown as the "del", "reply", and "other" buttons. In this example, the "other" button comprises a covert recovery option which allows the user to covertly invoke a message recovery indicator which enables the user to recover the redaction portion of the message. However, in other examples, the star symbols displayed on user interface 303D could comprise the message recovery indicator, and the user could simply click on the star symbols to provide a message recovery instruction to wireless communication device 301. Display 303D shows the user selecting the "other" button from the "message options" menu to covertly invoke a message recovery indicator. Note that the "other" button previously invoked the message redaction indicator as shown on display 303B in FIG. 3A when the message had no redacted portions. Thus, the "other" button invokes either a message redaction indicator or a message recovery indicator based on context, i.e., based on whether or not a portion of the message has previously been redacted.

Display 303E shows a recovery mode menu that the user has invoked by pressing the "other" button on display 303D. The recovery mode menu comprises a message recovery indicator. The recovery mode menu provides options for the user to reveal or restore redacted text. The "reveal" option allows the user to temporarily reveal the redacted portion without permanently restoring the original message. However, display 303E shows that the user has selected the "restore"

option, which directs wireless communication device 301 to fully recover the original message. In this example, wireless communication device 301 prompts the user for a password in response to receiving the message recovery instruction. Wireless communication device 301 will recover the message in response to the message recovery instruction after successful user authentication.

After providing the correct password, display 303F shows the message with the previously redacted portion displayed on user interface 303. Thus, in display 303F, the user's account PIN has been restored to the actual PIN information and the star mask has been removed. In this manner, wireless communication device 301 has recovered the original message for the user so that the user is able to again view the account PIN.

Figure 4A:
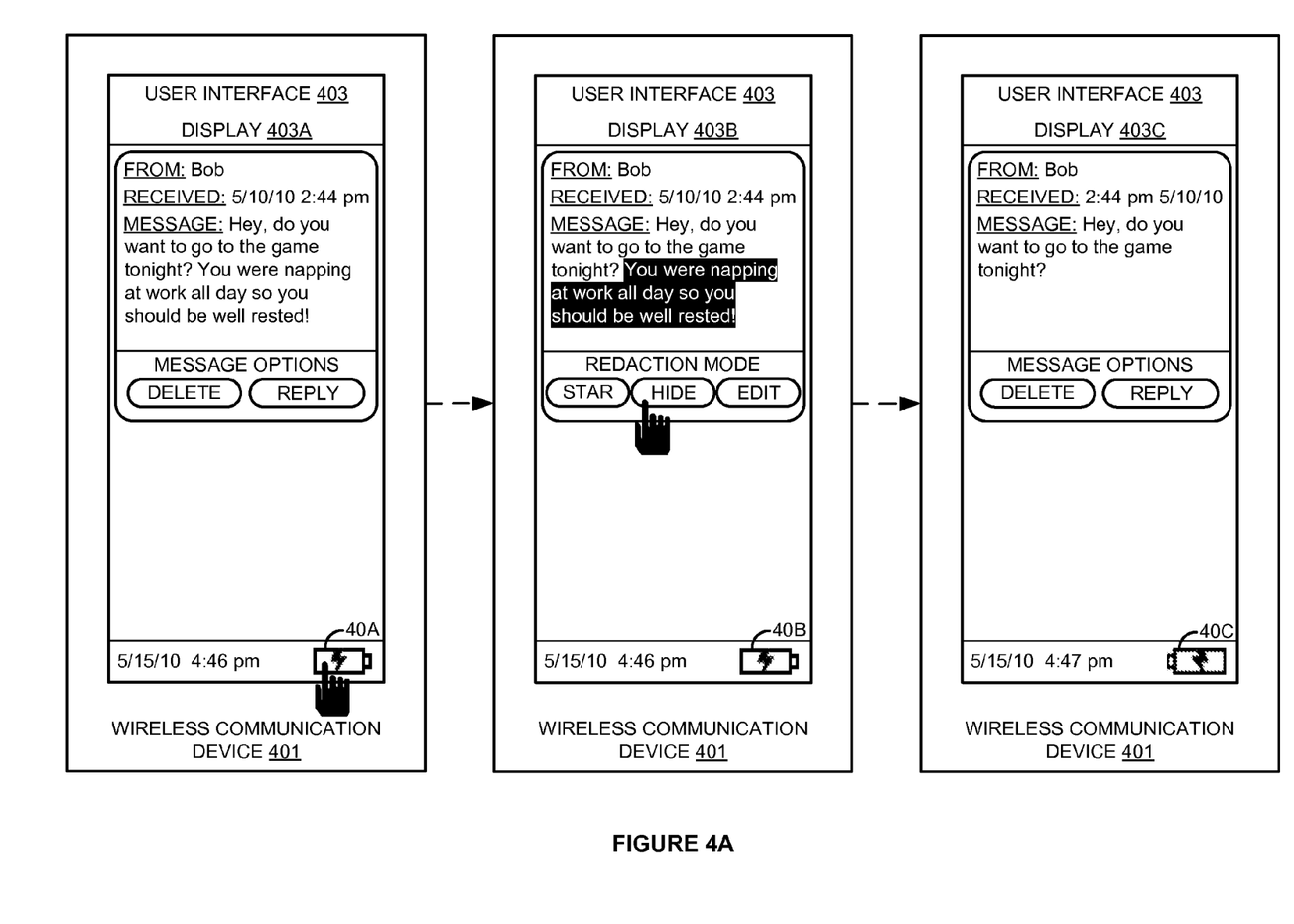
FIG. 4A is a block diagram that illustrates exemplary displays on a user interface of a wireless communication device in an exemplary embodiment.

FIG. 4A is a block diagram that illustrates exemplary displays 403A-403C on user interface 403 of wireless communication device 401 in an exemplary embodiment. The displays 403A-403C provide another example of a user experience when operating wireless communication device 401 to redact a portion of a message.

In display 403A, a user of wireless communication device 401 has received an SMS text message from Bob which is displayed on user interface 403. Unfortunately, the message from Bob indicates that the user was taking a nap all day at work, which the user wishes to conceal from other people who may inadvertently view the message, such as the user's boss or other co-workers. In this example, the user is presented with message options to only "delete" the message or "reply" to the sender. However, the user is aware that the battery icon 40A comprises a covert redaction option which will covertly invoke a message redaction indicator to allow the user to redact a portion of the message. In this example, the hand icon is shown on display 403A to indicate that the user has clicked the battery icon 40A to invoke a message redaction indicator.

Display 403B shows a redaction mode menu that the user has invoked by pressing the battery icon 40A on display 403A. The redaction mode menu comprises a message redaction indicator. The redaction mode menu provides options for the user to replace text with stars as indicated by the "star" button, remove text as indicated by the "hide" button, or replace text with alternate text using the "edit" button. In display 403B, the user has selected a portion of the message to redact as shown by the black highlighting appearing over the second sentence of the message. In addition, the user has selected the "hide" button to direct wireless communication device 401 to remove the selected portion so that it will not be displayed. The selected text and the selection of the "hide" button could comprise a message redaction instruction for wireless communication device 401. In some examples, wireless communication device 401 prompts the user for a password in response to receiving the message redaction instruction. However, in this example, the user has previously configured wireless communication device 401 to use a predetermined default password to protect redacted text in response to a message redaction instruction, so wireless communication device 401 does not prompt the user for a password.

In response to the message redaction instruction provided by the user as shown in display 403B, wireless communication device 401 redacts the portion of the message specified in the instruction. As shown on display 403C, wireless communication device 401 then displays the message without the redacted portion on user interface 403. Thus, in display 403C, the second sentence of Bob's original message has been hidden from view. Advantageously, any person reading the message cannot view Bob's statement about the user taking a nap since this portion of the message has been removed.

To help remind the user that the message has been redacted, display 403C shows two examples of covert notifications. The covert notifications comprise subtle modifications to displayed items on user interface 403 that indicate only to the user of wireless communication device 401 that the message being displayed has a hidden redacted portion. The first covert notification is that the battery icon 40C shown on display 403C has a different orientation than the battery icons 40A and 40B shown on respective displays 403A and 403B. In this example, the battery icon 40C has been rotated 180 degrees, which provides a covert notification to the user of wireless communication device 401 that the message from Bob is being displayed without a redacted portion. Advantageously, a person other than the user of device 401 is unlikely to notice the covert notification provided by the rotation of the battery icon 40C, and even if the subtle difference is detected, that person will not be aware that the changed orientation of battery icon 40C signifies that the message is being displayed without a redacted portion.

In addition, a second covert notification is displayed in the "received" field of the message, which has the date and time reversed from the previous displays 403A and 403B. The user may recognize that the date and time the message was received are displayed in reverse order on display 403C, which serves as an additional reminder to the user that the message being displayed contains a redacted portion that is hidden from view. However, anyone else who reads this message is unlikely to detect the slight modifications to display 403C or comprehend their meaning, and thus will remain unaware that the message has an additional redacted portion which is not being displayed.

The rotation of battery icon 40C and the reversed date and time fields on display 403C are just two examples of covert notifications, and one of skill in the art will understand that any subtle modification or alteration of any screen elements could also be used. In addition, the covert notifications are not limited to static screen elements but could also comprise video, textual, or auditory notifications. In some examples, wireless communication device 301 may present the user with an option to display all messages having redacted portions, or all messages having redacted portions that are associated with a particular contact or group of contacts. The option to display all messages having redacted portions could also be covertly invoked in a similar manner to the redaction and recovery mode menus. In some examples, the user may covertly invoke and enter a specialized menu to perform any of the functions described herein, such as message redaction, recovery, and display of all messages containing redacted portions.

Additionally, in some examples, wireless communication device 301 enables the user to create a covert contact, which may or may not actually be displayed among the user's other contacts stored on wireless communication device 301. The user of device 301 can then covertly invoke a redacted message menu by calling this covert contact, sending an SMS text message to the covert contact, or otherwise selecting the covert contact using wireless communication device 301. Instead of actually performing the select action, such as calling or sending a text message to the covert contact, wireless communication device 301 could display a redacted message menu containing all messages on device 301 having redacted portions, or only redacted messages associated with the covert contact, or only redacted messages associated with a predetermined group of contacts. For example, a user could create a covert contact for managing redacted messages from a particular group of friends, and another covert contact to group messages having redacted account passwords, PINs, and other sensitive information.

Figure 4B:
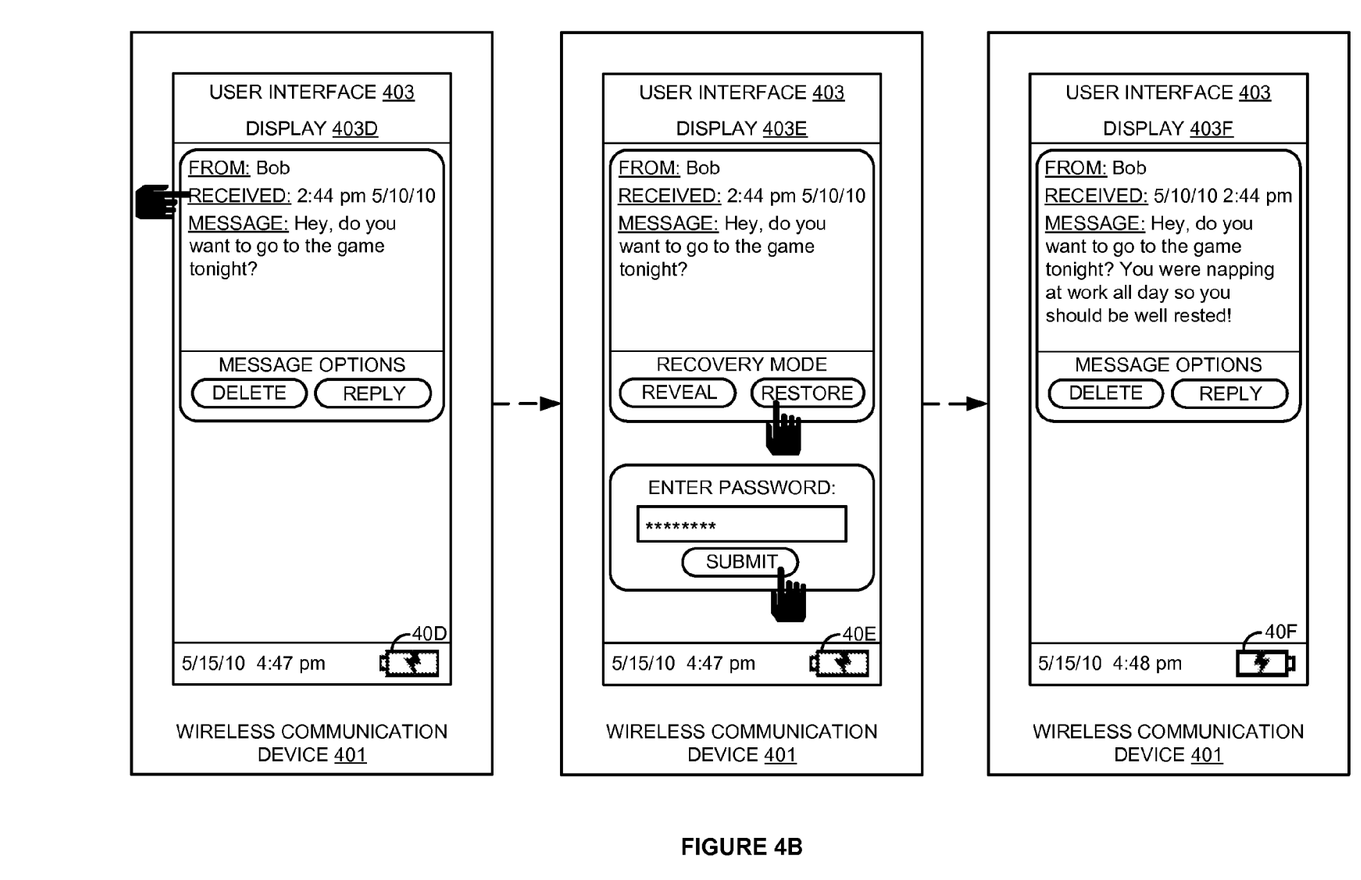
FIG. 4B is a block diagram that illustrates exemplary displays on a user interface of a wireless communication device in an exemplary embodiment.

FIG. 4B is a block diagram that illustrates exemplary displays 403D-403F on user interface 403 of wireless communication device 401 in an exemplary embodiment. The displays 403D-403F provide an example of a user experience when operating wireless communication device 401 to recover a previously redacted portion of a message. FIG. 4B is a continuation of FIG. 4A in which a user redacted a portion of an SMS text message received from Bob.

In display 403D, the message is displayed without the redacted portion. However, as discussed above, the only indications that the message has been redacted are the position of the battery icon 40D and the order that the date and time the message was received are displayed. In this example, the user may recover the redacted portion of the message by clicking on the "received" field of the message or by clicking on the reversed battery icon 40D, which are covert recovery options. These covert recovery options are intended to provide the user a mechanism to recover the redacted portion of the message without overtly indicating their functionality or that the message has been redacted. In display 403D, the user is shown selecting the "received" field to covertly invoke a message recovery mode.

Display 403E shows the message recovery mode that the user has invoked by selecting the message "received" field on display 403D. The message recovery mode presents a recovery mode menu that provides options for the user to reveal or restore redacted text. As shown on display 403E, the user has selected the "restore" option, which directs wireless communication device 401 to recover the previously redacted portion of the message. In this example, wireless communication device 401 prompts the user for a password in response to receiving the message recovery instruction to ensure the user is authorized to restore the original message.

After providing the correct password, display 403F shows the message along with the previously redacted portion displayed on user interface 403. In other words, wireless communication device 401 retrieves at least the redacted portion of the message from memory and displays the original, unmodified message on display 403F. Thus, in display 403F, the second sentence of Bob's message about the user napping at work is again displayed on user interface 403. In addition, note that the date and time are now restored to their original order, and the battery icon 40F is rotated back 180 degrees to its original position. The restoration of the battery icon 40F and the message "received" field date and time indicate to the user that the original message has been restored and is now displayed for the user to view in its entirety.

Although the above examples describe a user providing message redaction instructions to redact a portion of a message received by a wireless communication device 301 or 401, the ability for a user to redact and recover portions of messages transferred by wireless communication devices 301 and 401 for delivery to other communication devices is also contemplated herein. For example, wireless communication device 401 may display a series of bidirectional messages which are both received and transferred by wireless communication device 401 that form a conversation with another person. Wireless communication device 401 could be configured to process message redaction instructions and message recovery instructions for any message in the conversation, including messages generated by the user of device 401 and transferred for delivery to another user. A user of wireless communication device 401 could apply the techniques described above to redact and/or recover any portion of any message that may be displayed on device 401, including multiple portions of multiple messages in a conversation.

Figure 5:
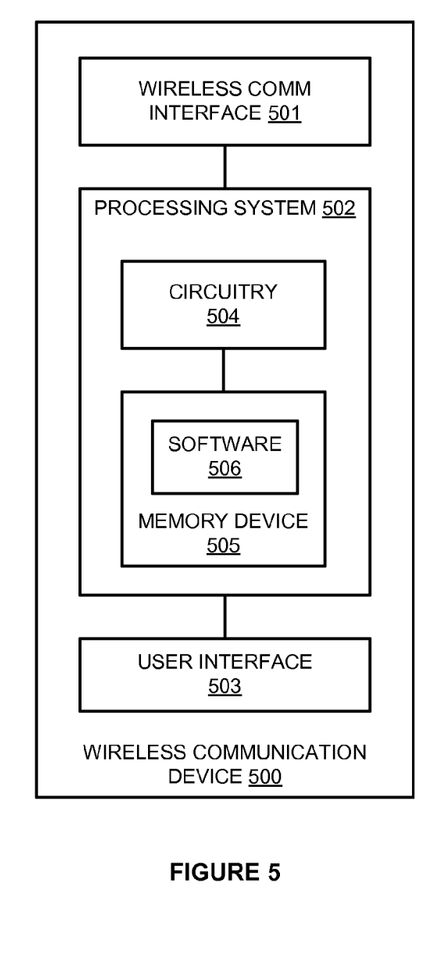
FIG. 5 is a block diagram that illustrates a wireless communication device.

FIG. 5 is a block diagram that illustrates wireless communication device 500. Wireless communication device 500 provides an example of wireless communication devices 101, 301, and 401, although devices 101, 301, and 401 could use alternative configurations. Wireless communication device 500 comprises wireless communication interface 501, processing system 502, and user interface 503. Processing system 502 is linked to wireless communication interface 501 and user interface 503. Processing system 502 includes processing circuitry 504 and memory device 505 that stores operating software 506. Wireless communication device 500 may include other well-known components such as a battery and enclosure that are not shown for clarity. Wireless communication device 500 may comprise a telephone, computer, e-book, mobile Internet appliance, media player, game console, wireless network interface card, or some other wireless communication apparatus—including combinations thereof.

Wireless communication interface 501 comprises RF communication circuitry and an antenna. The RF communication circuitry typically includes an amplifier, filter, RF modulator, and signal processing circuitry. Wireless communication interface 501 may also include a memory device, software, processing circuitry, or some other communication device. Wireless communication interface 501 may use various protocols, such as CDMA, GSM, UMTS, HSPA, EV-DO, EV-DO rev. A, 3GPP LTE, WiMAX, Wi-Fi, Bluetooth, Internet, telephony, or some other wireless communication format. Wireless communication interface 501 is configured to wirelessly receive a message.

User interface 503 comprises components that interact with a user to receive user inputs and to present media and/or information. User interface 503 may include a speaker, microphone, buttons, lights, display screen, touch screen, touch pad, scroll wheel, communication port, or some other user input/output apparatus—including combinations thereof. User interface 503 may be configured to display a message, display a message redaction indicator, and responsively receive a message redaction instruction. In addition, user interface 503 is configured to display the message without the redacted portion, display a message recovery indicator, and responsively receive a message recovery instruction. User interface 503 is also configured to display the message with the previously redacted portion.

Processing circuitry 504 comprises microprocessor and other circuitry that retrieves and executes operating software 506 from memory device 505. Memory device 505 comprises a disk drive, flash drive, data storage circuitry, or some other memory apparatus. Processing circuitry 504 is typically mounted on a circuit board that may also hold memory device 505 and portions of communication interface 501 and user interface 503. Operating software 506 comprises computer programs, firmware, or some other form of machine-readable processing instructions. Operating software 506 may include an operating system, utilities, drivers, network interfaces, applications, or some other type of software. When executed by processing circuitry 504, operating software 506 directs processing system 502 to operate wireless communication device 500 as described herein for wireless communication devices 101, 301, and 401.

In particular, operating software 506 directs processing system 502 to direct wireless communication interface 501 to wirelessly receive a message, and to direct memory device 505 to store the message. In addition, operating software 506 directs processing system 502 to drive user interface 503 to display the message, display a message redaction indicator, and responsively receive a message redaction instruction. Operating software 506 then directs processing system 502 to redact a portion of the message responsive to the message redaction instruction and direct memory device 505 to store the redacted portion of the message. Further, operating software 506 directs processing system 502 to drive user interface 503 to display the message without the redacted portion, display a message recovery indicator, and responsively receive a message recovery instruction. Finally, operating software 506 directs processing system 502 to recover the message responsive to the message recovery instruction and drive user interface 503 to display the message with the previously redacted portion.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A wireless communication device comprising:
   a user interface;
   a memory;
   a wireless communication interface configured to wirelessly receive a message;
   a processing system configured to direct the memory to store the message;
   the processing system configured to drive the user interface to display the message, display a message redaction indicator, and responsively receive a message redaction instruction;
   the processing system configured to redact a portion of the message responsive to the message redaction instruction and direct the memory to store the redacted portion of the message;
   the processing system configured to drive the user interface to display the message without the redacted portion, display a message recovery indicator, and responsively receive a message recovery instruction; and
   the processing system configured to recover the message responsive to the message recovery instruction and drive the user interface to display the message with the previously redacted portion.

2. The wireless communication device of claim 1 wherein the processing system configured to drive the user interface to display the message redaction indicator comprises the processing system configured to drive the user interface to display the message redaction indicator responsive to receiving a selection of a covert redaction option.

3. The wireless communication device of claim 2 wherein the covert redaction option comprises a hidden menu item.

4. The wireless communication device of claim 1 wherein the processing system configured to drive the user interface to display the message recovery indicator comprises the processing system configured to drive the user interface to display the message recovery indicator responsive to receiving a selection of a covert recovery option.

5. The wireless communication device of claim 1 wherein the processing system configured to drive the user interface to display the message without the redacted portion comprises the processing system configured to drive the user interface to display the message without the redacted portion along with a covert notification that indicates the message is partially redacted.

6. The wireless communication device of claim 5 wherein the covert notification comprises only a changed location of a displayed item.

7. The wireless communication device of claim 1 wherein the processing system configured to recover the message responsive to the message recovery instruction comprises the processing system configured to recover the message responsive to the message recovery instruction after successful user authentication.

8. The wireless communication device of claim 1 wherein the message comprises a short message service message.

9. The wireless communication device of claim 1 wherein the message comprises an email message.

10. The wireless communication device of claim 1 wherein the message comprises a visual voicemail message.

11. A method of operating a wireless communication device, the method comprising:
    wirelessly receiving a message, storing the message, and displaying the message;
    displaying a message redaction indicator and responsively receiving a message redaction instruction;
    redacting a portion of the message responsive to the message redaction instruction and storing the redacted portion of the message;
    displaying the message without the redacted portion;
    displaying a message recovery indicator and responsively receiving a message recovery instruction; and
    recovering the message responsive to the message recovery instruction and displaying the message with the previously redacted portion.

12. The method of claim 11 wherein displaying the message redaction indicator comprises displaying the message redaction indicator responsive to receiving a selection of a covert redaction option.

13. The method of claim 12 wherein the covert redaction option comprises a hidden menu item.

14. The method of claim 11 wherein displaying the message recovery indicator comprises displaying the message recovery indicator responsive to receiving a selection of a covert recovery option.

15. The method of claim 11 wherein displaying the message without the redacted portion comprises displaying the message without the redacted portion along with a covert notification that indicates the message is partially redacted.

16. The method of claim 15 wherein the covert notification comprises only a changed location of a displayed item.

17. The method of claim 11 wherein recovering the message responsive to the message recovery instruction recovering the message responsive to the message recovery instruction after successful user authentication.

18. The method of claim 11 wherein the message comprises a short message service message.

19. The method of claim 11 wherein the message comprises an email message.

20. A wireless communication device comprising:
    a user interface;
    a memory;
    a wireless communication interface configured to wirelessly receive a short message service (SMS) message;
    a processing system configured to direct the memory to store the SMS message;
    the processing system configured to drive the user interface to display the SMS message, covertly display a message redaction indicator, and responsively receive a message redaction instruction;
    the processing system configured to redact a portion of the SMS message responsive to the message redaction instruction and direct the memory to store the redacted portion of the SMS message;

the processing system configured to drive the user interface to display the SMS message without the redacted portion, covertly display a message recovery indicator, receive a selection of the message recovery indicator, prompt for user authentication responsive to the selection of the message recovery indicator, and responsively receive a message recovery instruction; and the processing system configured to recover the SMS message responsive to the message recovery instruction and drive the user interface to display the SMS message with the previously redacted portion.

* * * * *